US010271036B2

(12) United States Patent
Phipps

(10) Patent No.: US 10,271,036 B2
(45) Date of Patent: Apr. 23, 2019

(54) SYSTEMS AND METHODS FOR INCORPORATING TWO DIMENSIONAL IMAGES CAPTURED BY A MOVING STUDIO CAMERA WITH ACTIVELY CONTROLLED OPTICS INTO A VIRTUAL THREE DIMENSIONAL COORDINATE SYSTEM

(71) Applicant: Motion Analysis Corporation, Santa Rosa, CA (US)

(72) Inventor: Ned Herman Phipps, Santa Rosa, CA (US)

(73) Assignee: Motion Analysis Corporation, Rohnert Park, CA (US)

( * ) Notice: Subject to any disclaimer, the term of this patent is extended or adjusted under 35 U.S.C. 154(b) by 0 days.

(21) Appl. No.: 14/659,467

(22) Filed: Mar. 16, 2015

(65) Prior Publication Data
US 2015/0195509 A1 Jul. 9, 2015

Related U.S. Application Data

(63) Continuation of application No. 13/232,938, filed on Sep. 14, 2011, now abandoned.

(51) Int. Cl.
*H04N 13/20* (2018.01)
*G01B 11/25* (2006.01)
*G06T 7/00* (2017.01)
*H04N 13/296* (2018.01)
*H04N 13/204* (2018.01)
*H04N 5/222* (2006.01)
*G06T 7/70* (2017.01)

(52) U.S. Cl.
CPC ......... *H04N 13/204* (2018.05); *G01B 11/254* (2013.01); *G06T 7/70* (2017.01); *H04N 5/2224* (2013.01)

(58) Field of Classification Search
CPC ......... H04N 13/0055; H04N 19/00769; H04N 13/0239; H04N 13/0059; H04N 13/0048; H04N 13/0242; H04N 13/0404
USPC ............................................ 348/43, 48, 50
See application file for complete search history.

(56) References Cited

U.S. PATENT DOCUMENTS

| | | | |
|---|---|---|---|
| 5,889,550 A | 3/1999 | Reynolds | |
| 6,522,787 B1 | 2/2003 | Kumar et al. | |
| 2006/0165310 A1 | 7/2006 | Mack | |
| 2007/0076096 A1* | 4/2007 | Alexander | G06T 7/0018 348/169 |
| 2007/0104361 A1 | 5/2007 | Alexander | |
| 2011/0025853 A1* | 2/2011 | Richardson | G06T 7/2033 348/159 |

* cited by examiner

Primary Examiner — Hee-Yong Kim
(74) Attorney, Agent, or Firm — Manatt, Phelps & Phillips LLP

(57) ABSTRACT

A method for incorporating two dimensional images such as those captured by a video camera, which is moving and whose optics, particularly zoom and focus, are controlled by a human or by automatic means, into a virtual three dimensional coordinate system is provided In one embodiment the method acquires calibration data over the functional range of the studio camera optics, and then in operation dynamically performs the appropriate transformations needed to map the video stream to the virtual coordinate system, even as the acquiring studio camera moves, zooms, and changes focus.

2 Claims, 8 Drawing Sheets

SYSTEMS AND METHODS FOR INCORPORATING TWO DIMENSIONAL IMAGES CAPTURED BY A MOVING STUDIO CAMERA WITH ACTIVELY CONTROLLED OPTICS INTO A VIRTUAL THREE DIMENSIONAL COORDINATE SYSTEM

CROSS-REFERENCE TO RELATED APPLICATION

This application is a continuation application of U.S. application Ser. No. 13/232,938 which was filed Sep. 14, 2011, and entitled "Systems and Methods for Incorporating Two Dimensional Images Captured by a Moving Studio Camera with Actively Controlled Optics into a Virtual Three Dimensional Coordinate System" which is incorporated herein entity by reference.

FIELD OF THE INVENTION

The invention relates generally to image capture and more particularly to systems and methods for incorporating two dimensional images into three dimensional coordinate systems.

BACKGROUND

A tremendous amount of video content is produced professionally every year, with applications in television broadcast, movie production, and webcasts to name a few. The vast majority of this content is two dimensional—NTSC, PAL, or High Definition video, with many other formats, resolutions, sampling rates, and intended uses. Another very large content production source is 30 modeling and character animation, with applications in video games, movies, and television, virtual worlds, simulators, etc. This content is produced and stored in three dimensional format, though in applications such as movies and television the produced product is a two dimensional projection of the three dimensional asset, whether a character, prop, scene, etc.

For some applications, it would be beneficial to be able to capture live video from commercially available and in-current-use video systems, such as TV or movie cameras, and be able to project that video stream into a three dimensional virtual coordinate system, which underpins any three dimensional modeling application, such as a virtual set, a virtual world, etc. However, there is an extremely limiting condition common to extant approaches. The novel systems and methods presented herein overcome these limitations, and address the need in modern video production practice to move studio cameras and change the zoom and focus of the cameras dynamically, while a performance is under production, including possibly being broadcast live. This novel approach is distinct from traditional approaches of setting studio camera locations, setting the optics at one particular zoom and focus, and acquiring calibration and production video at that one set of camera parameters, internal and external.

Others deal with this issue only partially and in a way that does not allow or suggest the un-restricted production control practice of a freely moving, zooming, and focusing studio camera. Reynolds U.S. Pat. No. 5,889,550 teaches a method to deal with a moving camera, but requires and is dependent on acquiring video with fixed optics. Alexander, US Patent Publication No. 20070076096 teaches a method for calibrating moving, dynamic-optics imagers that is distinct from the novel method herein and is limited by two restrictions: the devices described are 3D imagers including an illumination system, and more importantly the method requires the use of a very significant pre-calibration device Alexander US Publication No. 20070104361, including a linear motorized track and a large planar checkerboard target. In contrast, the novel methods described herein provide for complete freedom of movement of the studio camera within the volume of interest, and allow un-restricted control of the studio camera optics (zoom and focus), with the complete calibration performed in-situ, with the only calibration devices needed a simple ruled rigid stick with two or more visible features (often retro-reflective markers) and a rigid ruled right-angle, with three or more ruled visible features (often retro-reflective markers).

SUMMARY

An embodiment of the present invention provides a method for incorporating two dimensional images captured by a moving studio camera with actively controlled optics into a virtual three dimensional coordinate system. The method includes encoding and accessing the zoom and focus settings for the at least one studio camera, identifying a marked calibration ruler, locating a marked calibration right angle on the calibration ruler, capturing calibration data over a functional range of the zoom and focus controls, calculating the internal camera calibration parameters and applying the parameters during video production, and tracking the moving studio camera.

Another embodiment of the present invention provides a system for incorporating two dimensional images captured by at least one moving studio camera with actively controlled optics into a virtual three dimensional coordinate system. The system includes a device for encoding and accessing the zoom and focus settings for the moving at least one studio camera; a marked calibration ruler; a marked calibration right angle; a host module, adapted to capture calibration data over a functional range of the zoom and focus controls from the moving at least one studio camera data; a first logic processing module configured to receive and calculate internal camera calibration parameters and apply the parameters during video production, and a tracking module configured to track the moving camera.

Other objectives, advantages, and applications of the embodiments of the present invention will be made clear by the following detailed description of a preferred embodiment of the present invention. The description makes reference to drawings in which:

BRIEF DESCRIPTION OF DRAWINGS

Non-limiting and non-exhaustive embodiments of the present invention are described with reference to the following drawings. In the drawings, like reference numerals refer to like parts throughout the various figures unless otherwise specified.

For a better understanding of embodiments of the present invention, reference is made to the following Detailed Description, which is to be read in association with the accompanying drawings, wherein.

DETAILED DESCRIPTION OF PREFERRED EMBODIMENTS

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." The term "coupled" implies that the elements may be directly connected together or may be coupled through one or more intervening elements. Further reference may be made to an embodiment where a component is implemented and multiple like or identical components are implemented. In such instances a reference may be made to (a . . . n), this is not a limitation on the placement or number of components but indicates rather that a multiple and perhaps indefinite number of components may be implemented and the placement of such may vary.

Figure 1:
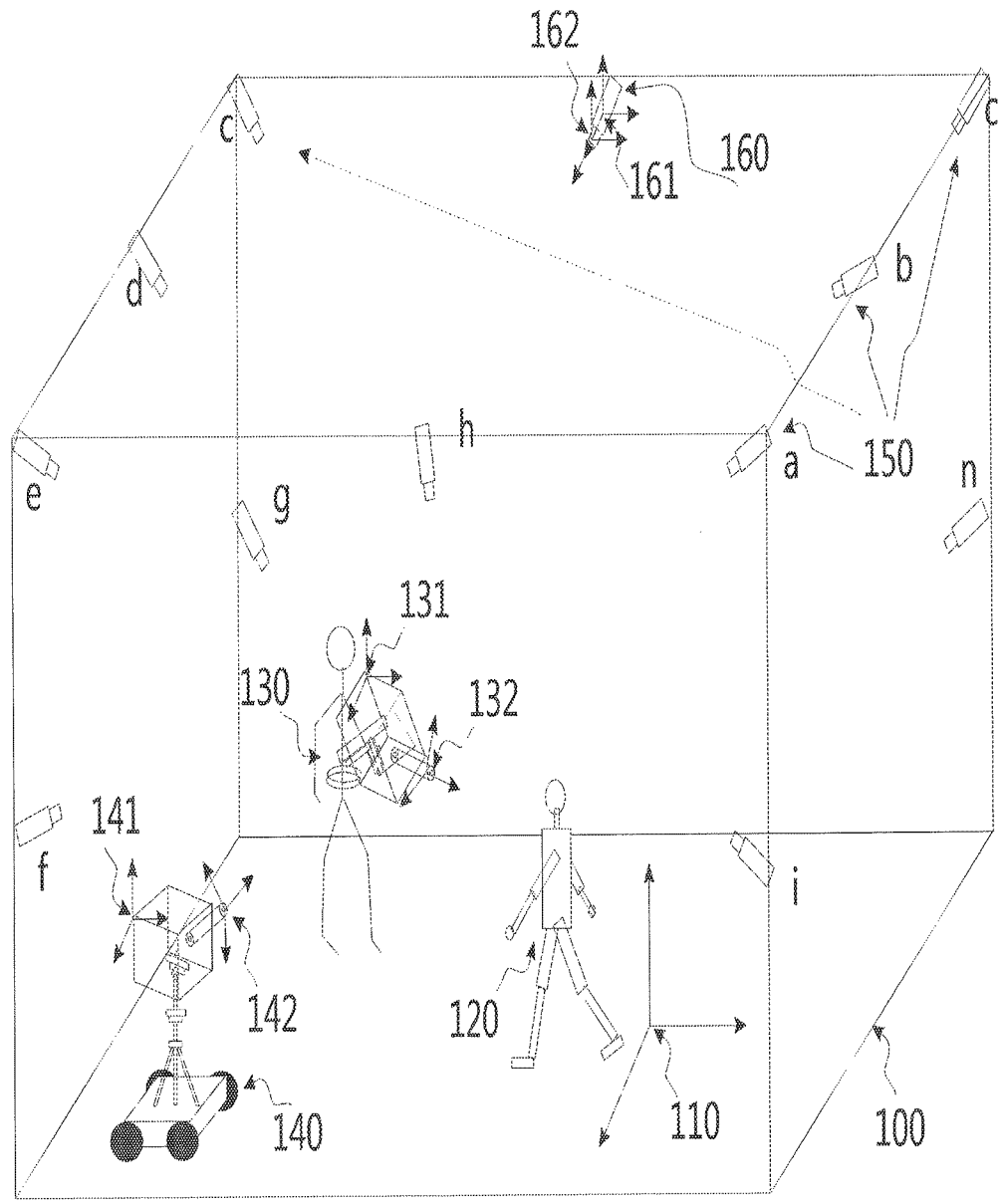
FIG. 1 depicts one embodiment of a studio, including a three dimensional imaging system, and two exemplar two dimensional studio cameras.

FIG. 1 shows a studio 100, wherein the studio 100 includes a three dimensional motion capture system and two exemplar two dimensional studio cameras 130,140. In operation a subject 120 moves within the studio 100. Although referred to as a studio, the embodiments of the present invention are capable of being incorporated into any volume of space. Shown are a Virtual 3D coordinate system 110; the fixed cameras 150 (a . . . n). One exemplar fixed camera 160 is shown in detail, demonstrating that each fixed camera 160, 150 (a . . . n) has a Camera Arbitrary 3D coordinate system 161 and an Image Plane 2D coordinate system 162, for the (a . . . n) fixed cameras shown. Also shown, for j=1,2 are the studio cameras 130,140, each of which has a Camera Arbitrary 3D coordinate system 131, 141 and an Image Plane 2D coordinate system 132, 142, for each exemplar device 130, 140.

Figure 2:
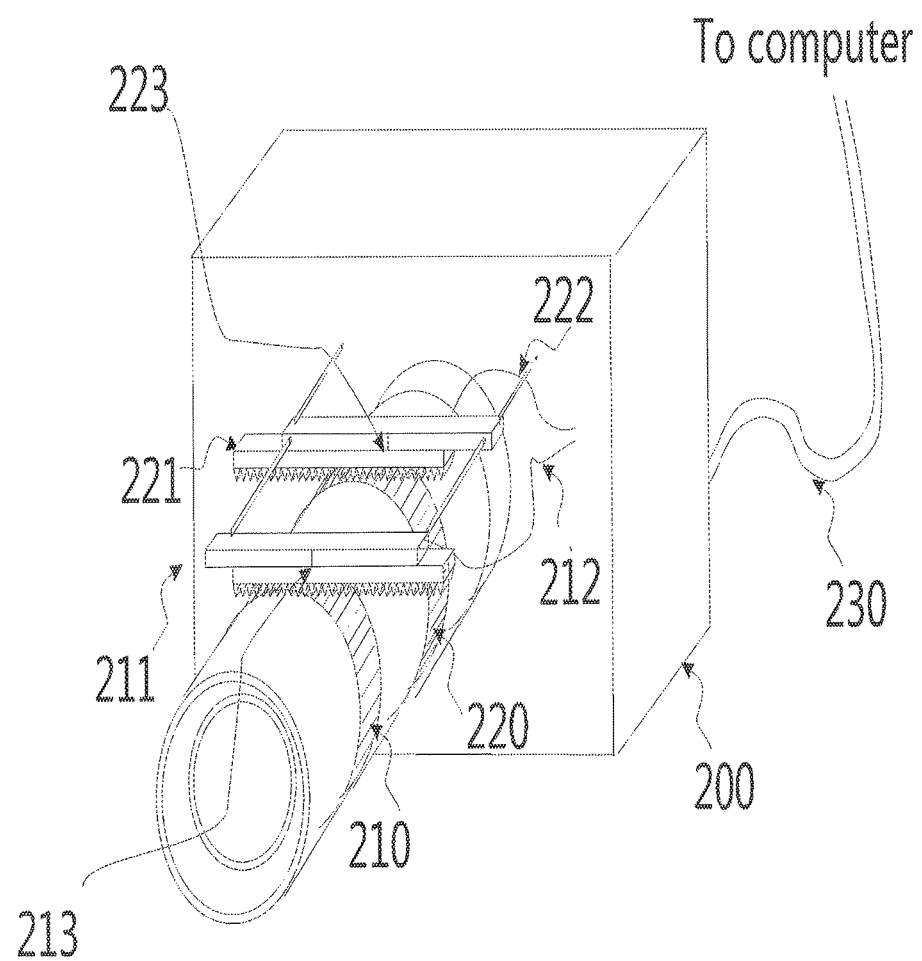
FIG. 2 illustrates an embodiment of a two dimensional studio camera with dynamic optics.

FIG. 2 depicts an embodiment of a two dimensional studio camera 200 with dynamic optics. The zoom 220 and focus 210 controls of the studio camera 200 are encoded electronically and sent back 230 to a data acquisition system. The studio camera 200 may be coupled to the data acquisition directly or indirectly. The focus 210 and zoom 220 may be controlled manually or through automation. Although the automation as shown implements a cog system 211,221, this is not intended to be a limitation on the method or mean for controlling the zoom 220 and focus 210 controls. The data acquisition system describes where along their full range of travel each of the zoom and focus controls are. For example, if the zoom and focus are controlled by a linear stage, the current center spoke locations 213 and 223 might be transmitted. The data acquisition system may comprise a computer, which has a host module, and various modules including but not limited to coordinate calculation modules, data acquisition modules, logic processing modules, tracking modules, and a database modules for storing data.

Figure 3:
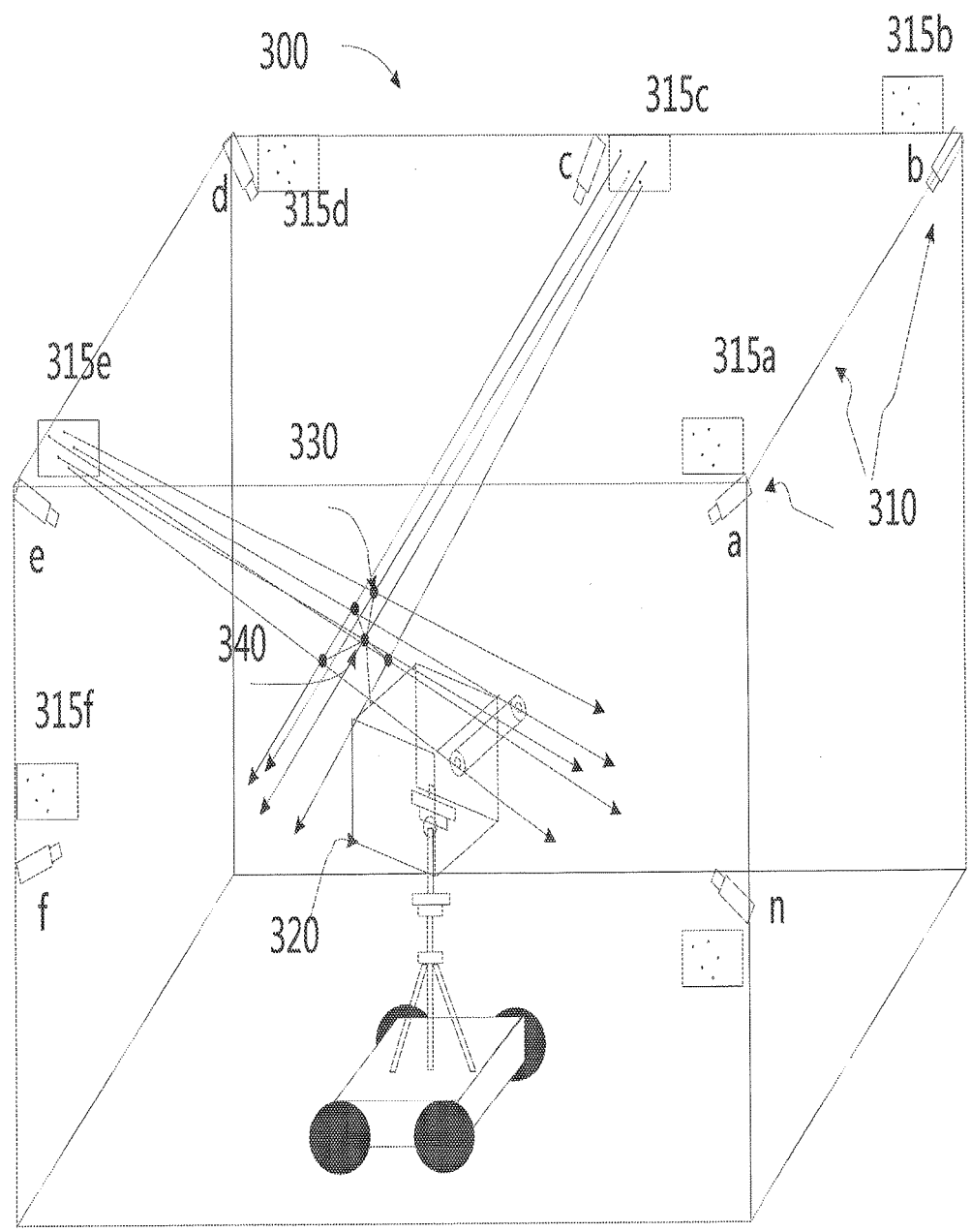
FIG. 3 depicts a frame of motion capture data after calibration of the motion capture system in accordance with one embodiment.

FIG. 3 shows a frame of motion capture data after calibration of the motion capture system 300. Fixed cameras 310 (a . . . n) cooperate with an imaging device 320. Retro-reflective markers 340, which are rigidly affixed to the studio camera 320, are imaged by the fixed cameras 310 (a . . . n). Each of the motion capture devices 310 are calibrated to a common virtual coordinate system, so that it is possible to generate a ray from the feature locations on each of the fixed camera planes 315 (a . . . n) through the volume, and to automatically examine locations where those vectors (nearly) intersect 330, and from that data estimate the 3D locations of those retro-reflective markers. In this case, five retro-reflective markers 340 are attached rigidly to a studio camera. The 3D coordinates of this group of markers can be used to form an orthogonal 3D coordinate system, either by construction or mathematical manipulation.

Figure 4:
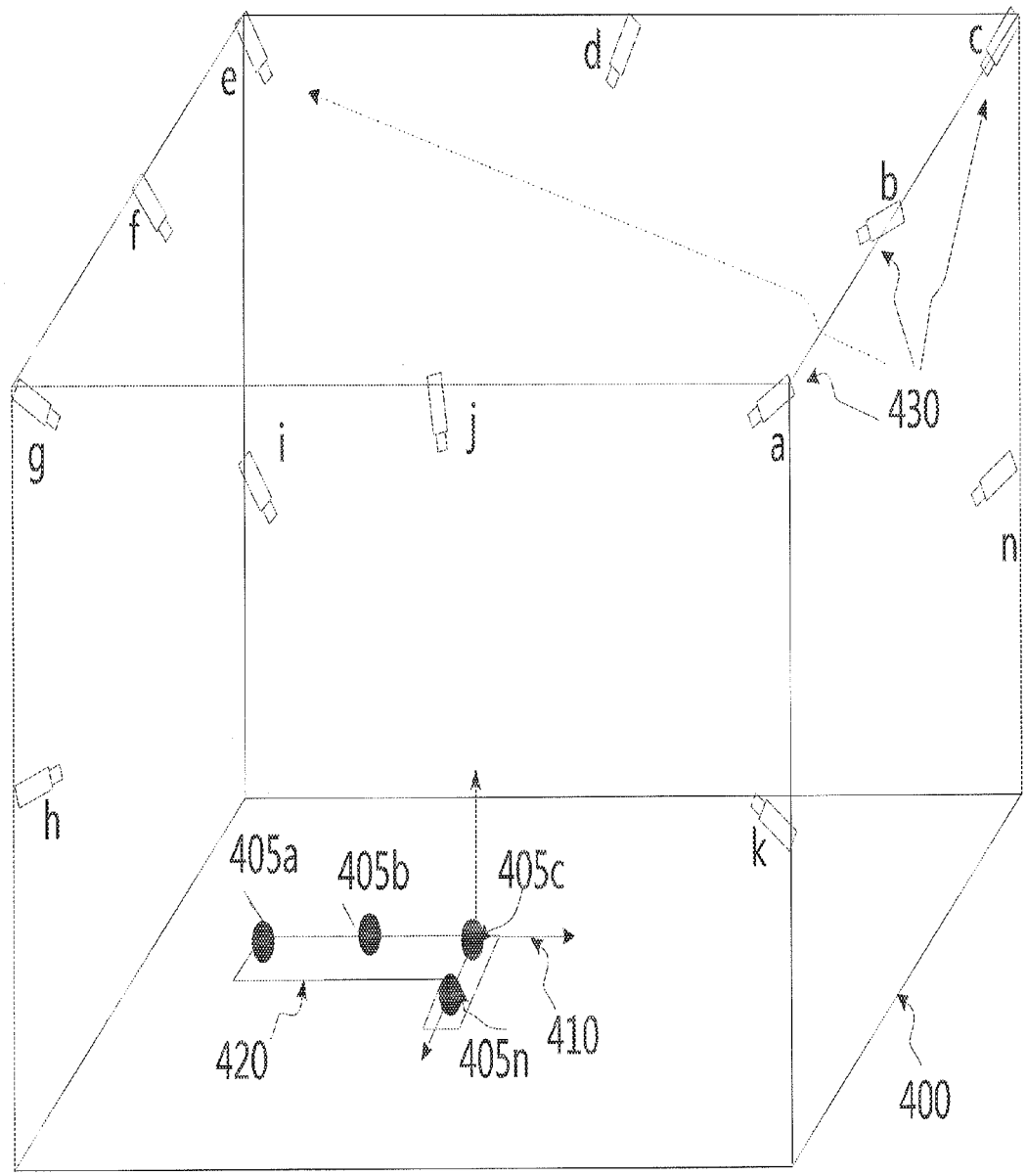
FIG. 4 shows the motion capture system of FIG. 3 in a pre-calibration stage in accordance with an embodiment of the present invention.

FIG. 4 shows a motion capture system in the pre-calibration stage 400. Three or more retro-reflective markers 405 (a . . . n) are attached to a rigid orthogonal device 420 and this device is placed at the desired location 410 of the virtual coordinate system. This produces an initial estimate of the motion capture system's fixed camera's 430 (a . . . n) external and internal camera parameters.

Figure 5:
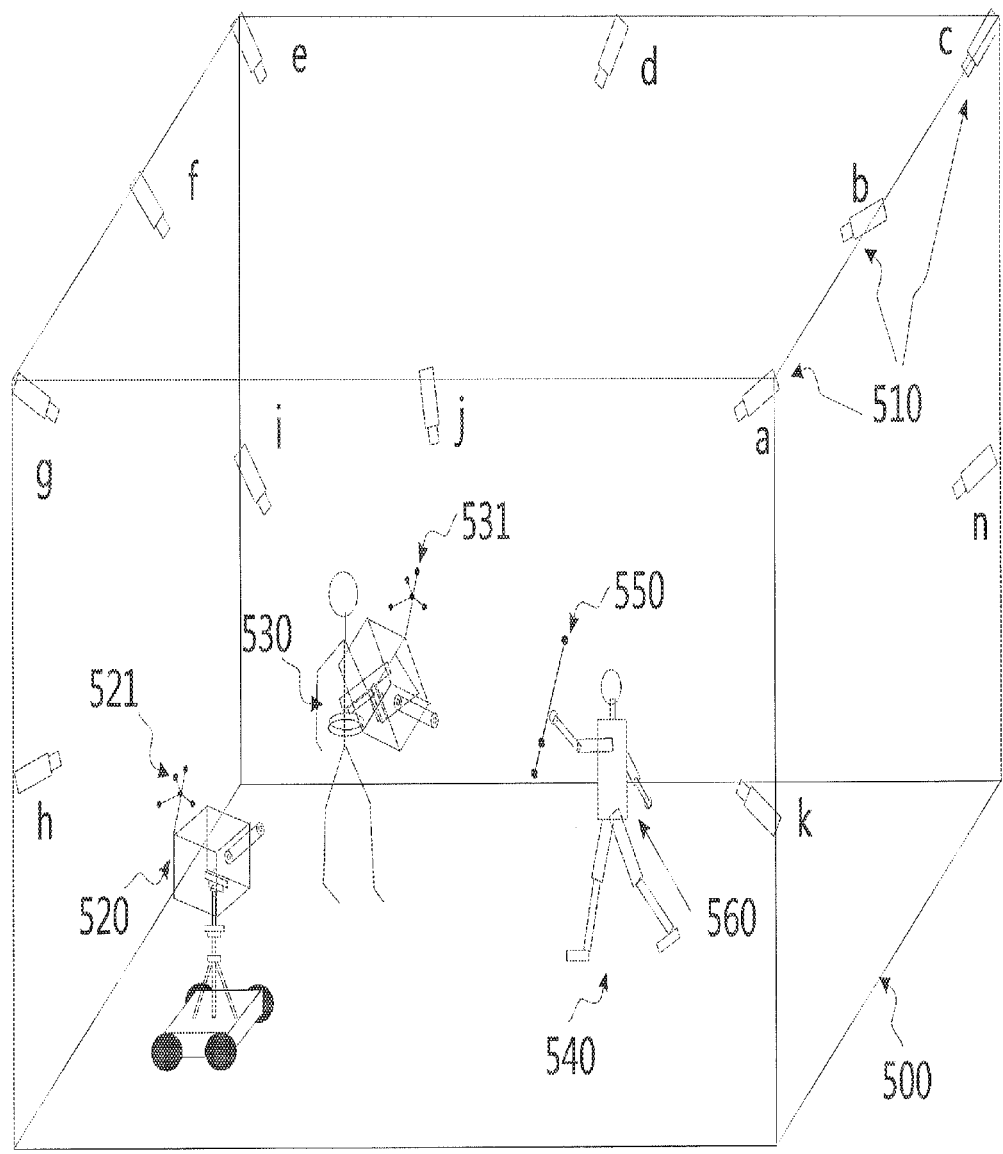
FIG. 5 show the motion capture system of FIG. 3 in a main calibration stage in accordance with an embodiment of the present invention.

FIG. 5 show a motion capture system in a main calibration stage 500. The studio camera(s) 520, 530 are introduced to the studio, any one of which has a motion capture system detectable rigid coordinate system 521, 531 rigidly attached. The studio cameras may operate as automated systems 520 or may be manually operated 530, further there may be multiple cameras operated in the same or multiple ways. There may be one or more studio cameras, although two studio cameras are shown in the embodiment, this is not intended to be a limitation on the scope of the present embodiments. A human operator 540 walks around the volume of interest, waving a calibration wand 550 over as much of the volume as practical. Although preferably the operator calibrates the entire volume, nevertheless, embodiments of the present invention contemplate the operator waving a calibration wand over less that the entire volume. In alternate embodiments the human operator may be replaced by an automated operator such as a robot, further, embodiments may include non-human subjects subject as animals or anything capable of motion. The studio camera operator, human or automatic, images the calibration wand, changing zoom, focus, and location over time. Fixed cameras 510 (a . . . n) cooperate to calibrate the system.

Figure 6:
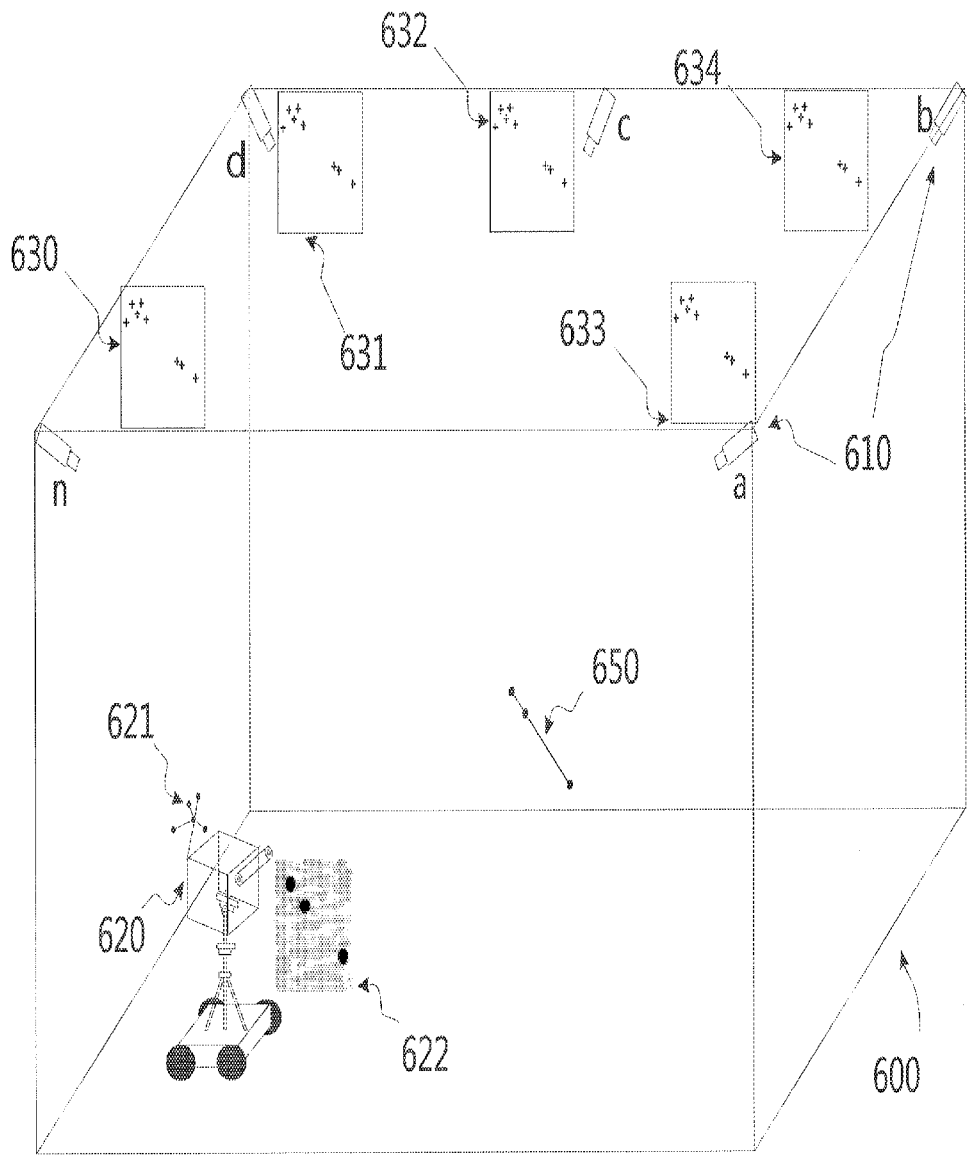
FIG. 6 depicts one embodiment of a frame of motion capture system calibration data (wand data) in accordance with an embodiment of the present invention.

FIG. 6 shows a frame of motion capture system calibration data (wand data) 600. At least two retro-reflective markers located on the calibration wand 650 are imaged by the motion capture system 610(a . . . n) and by the studio camera 620. Although one studio camera is shown, this is not intended to be a limitation on the number of studio cameras and more cameras could be implemented in the motion capture calibration system. The motion capture system observes 2D projections (630-634) of the 3D markers in multiple imaging planes. The true 3D distances between the markers are known, and a current estimate of the camera parameters and the 3D locations of the markers are also known. The studio camera calibration 622 is similarly collected. An iterative process is used to adjust the estimate of the camera parameters and the estimate of the markers' locations until convergence.

Figure 7:
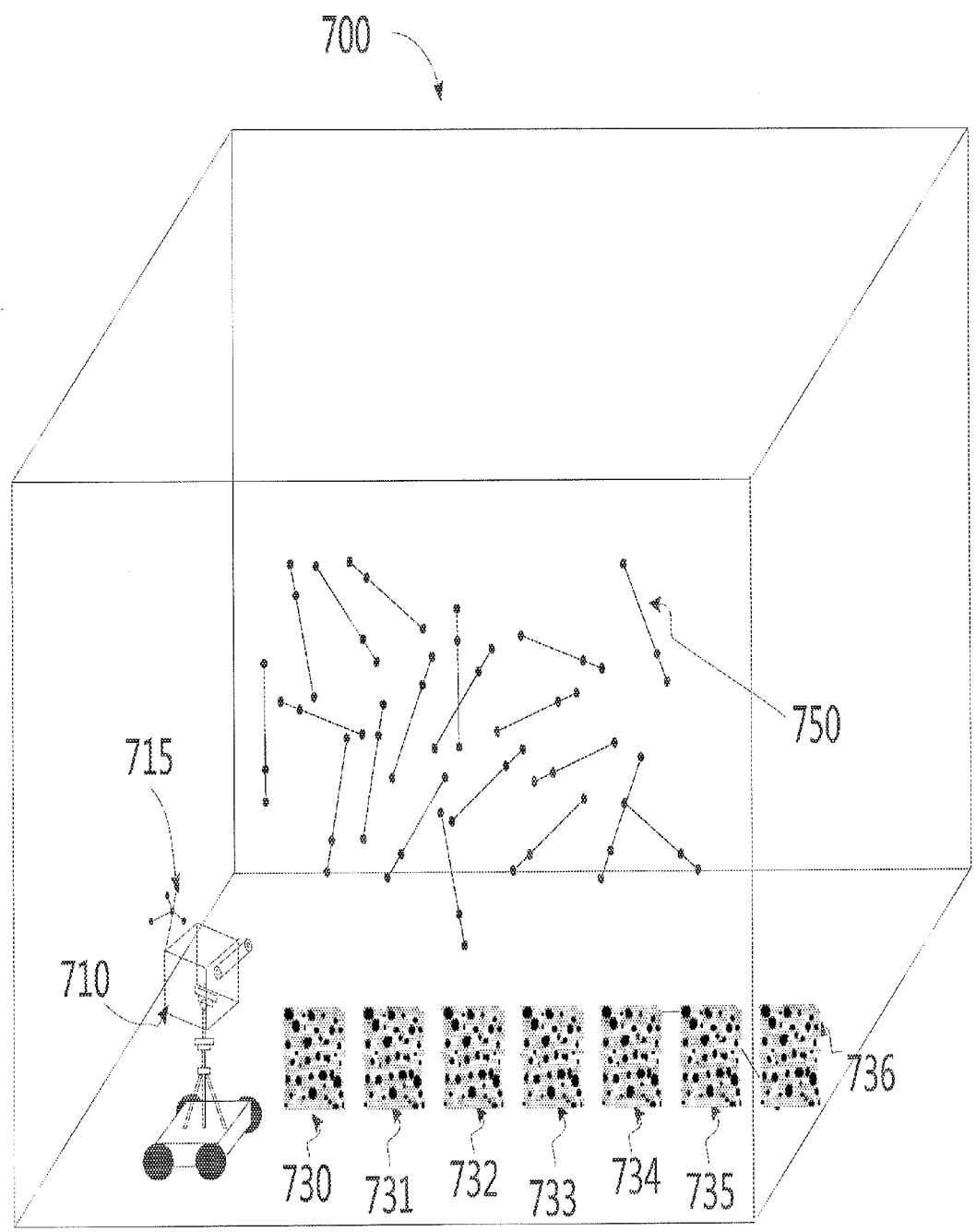
FIG. 7 depicts an embodiment of multiple frames of studio camera calibration data in accordance with an embodiment of the present invention.

FIG. 7 shows multiple frames of studio camera calibration data 700. The motion capture system is capable of producing highly accurate 3D locations for all of the wand data 750. The projection of this 3D object onto the studio camera 710, having its own marker system 715, imaging plane produces corresponding D data 730-736 over the functional range of the studio camera optics (zoom and focus). The encoded zoom and focus range data provide a first estimate of the studio camera calibration parameters for a given frame of data. A number of frames with the same encoded zoom and focus are automatically examined, and a set of simultaneous equations involving the 3D marker locations and their 2D projections is set up, from which the studio camera calibration parameters at this zoom and focus are calculated. This procedure is repeated at all of the other zoom and focus conditions acquired during calibration.

Figure 8:
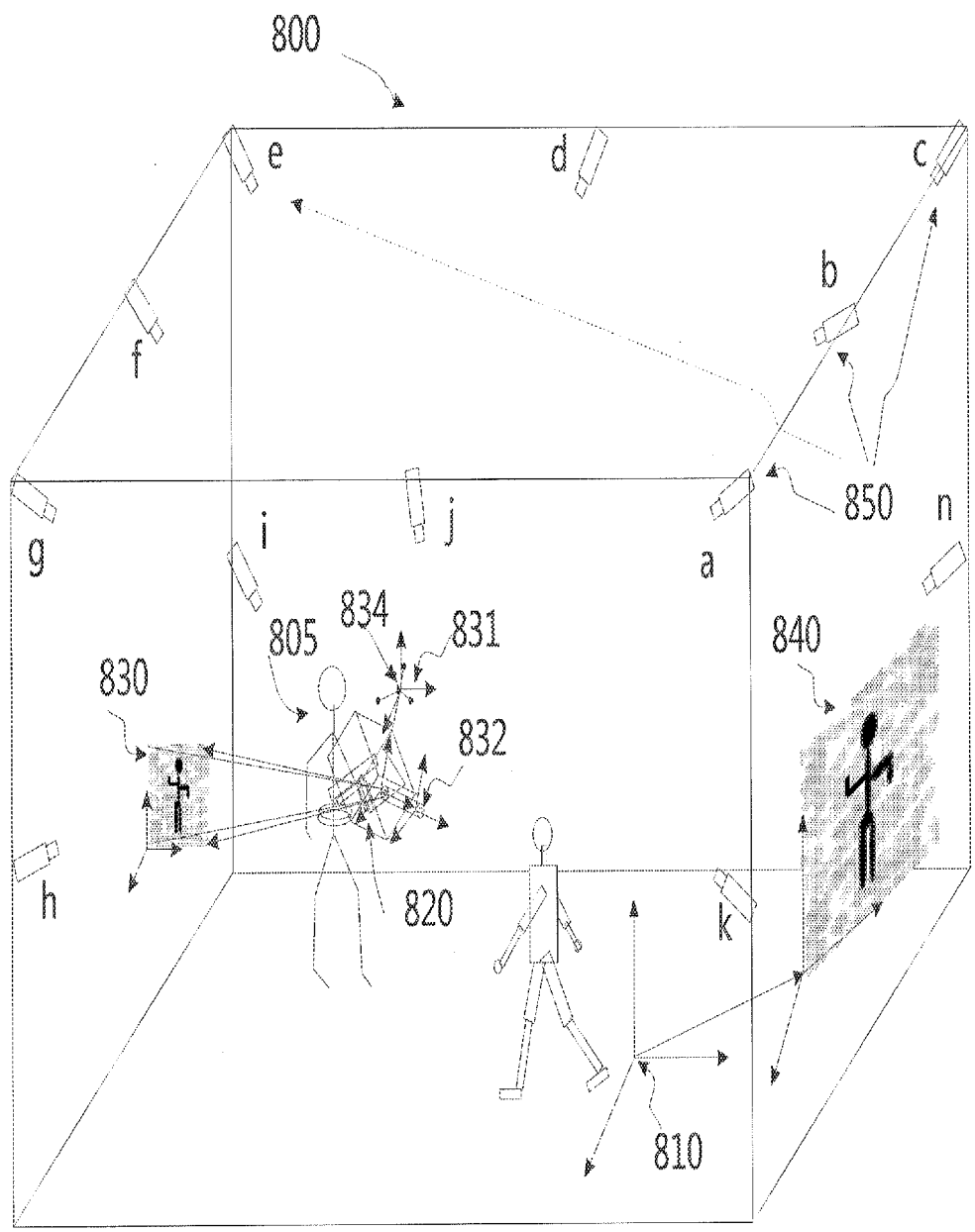
FIG. 8 shows a studio camera in operation in accordance with one embodiment.

FIG. 8 depicts a studio camera in operation 800. As an operator 805 moves, zooms, and changes focus on the studio camera 820, the motion capture system 850 (a . . . n) observes the markers 834 attached to the camera 820 and determines the location of the Camera Arbitrary coordinate system 831 in the virtual coordinate system. The encoded zoom and focus data generated by the studio camera 820 is read, and the appropriate current frame camera calibration data is interpolated from the zoom and focus conditions captured during calibration. The fixed cameras 850(a . . . n) produce the virtual coordinate system 810, the location of the Camera Arbitrary 3D coordinate system 831, and the Camera Image Plane coordinate system 832. The studio camera 20 produces the image data 830. Embodiments of the invention combines this information, along with information from the zoom and focus encoders in the studio camera, and the calibration data, to transform the image data 830 to the final image 840 in the virtual coordinate system 810.

In operation, embodiments of the present system capture two-dimensional data and transform it into a three dimensional system. In order to effectively incorporate video data into the virtual coordinate system the studio cameras are modeled and the parameters of the camera models are determined. This process may be referred to as calibration. Once the calibration of the studio camera over the functional range of its zoom and focus settings is complete, a motion tracking system is implemented to track the movement of the studio camera while synchronously collecting zoom and focus settings from that camera. The tracking is calibrated so that the principal point of the studio camera's lens is tracked. In alternate embodiments, generator Jock or genlock is not employed so that it is not necessary to synchronize the video output of one source, or a specific reference signal from a signal generator, with other pictures or images. Generally such synchronization enables the coincidence of signals in time at a combining or mixing or switching point. The novel embodiments of the present invention allow such without the need for genlock. The process involves at least two steps-Calibrating and Tracking.

Calibration is the process that provides the offset from object on the camera to the principle point of the camera's lens and also provides the parameters describing the properties of the camera's lens. To calculate offset two objects are tracked—the object on the camera and the calibration wand—in addition, video data of the wand from the camera is collected. The system is then calibrated. In a preferred embodiment, the system is calibrated from about ten frames of data. The calibration process in then repeated at various lens settings. Although ten frames of data are used for calibration in a preferred embodiment, this number of frames is not intended to be a limitation on the scope of the embodiments and a fewer or greater number of frames may be used to complete the calibration. The tracking object has two segments. The first segment represents the tracking object. The second segment represents the studio camera's principal point. These segments have six degrees of freedom (6 DOF).

The data for the calibration includes N frames (nFrames) of data, where N may be any number of frames. Preferably N is between 5 and 15 frames. Each frame has 2 or more wand points in the video and 2 or more wand points from the motion capture ("mocap") data as well as the position of the tracking object from the motion capture system. The data includes the following:
Wand Mocap Data:
  Wand[iFrame][iMarker][iAxis]
    iFrame=0 to Frames−1
    iMarker=0 to 1
    iAxis=0 . . . 2 (X,Y,Z)
  Wand Video Data:
  Centroid[iFrame][iMarker][iAxis]
    iFrame=0 to nFrames−1
    iMarker=0 to 1
    iAxis=0 . . . 1 (U,V)
  Object Mocap Data
  Object[iFrame][iDOF]
    iFrame=0 to nFrames−1
    iDOF=0 to 5

The calibration data is captured over the functional range of the zoom and focus controls from the studio camera. All of the calibration data is transmitted to a computer processing system. The system receives the data and calculates internal camera calibration parameters, then applies these parameters during video production.

Each frame of data is transformed into the coordinate system of the tracking object. This gives data as though the camera were stationary very close to the origin. The parameters to be calculated are the 6 degree of freedom offsets to the principal point and the camera lens parameters.

The lens parameters calculated for the studio camera model include the following:

Horizontal Principal Point (PPu)
Vertical Principal Point (PPv)
Horizontal Scale (Su)
Vertical Scale (Sv)
First order distortion (K1)

These lens parameters are used to convert a camera pixel coordinate (X,Y) of a marker into the corrected slopes (U,V) of the ray from the camera to the marker according to the following:

$X' = (X - PPu) * Su$
$Y' = (Y - PPv) * Sv$
$Factor = 1.0 + K1 * (X'^2 + Y'^2)$
U corrected = $X'$*Factor
V corrected = $Y'$*Factor These lens distortion parameters are calculated over the functional range of the studio camera zoom and focus controls. Given an XYZ location in the camera's field of view and a set of lens parameters the expected UV position of the centroid can be calculated. There are eleven calibration unknowns: Six (6) Principal Point Offsets and Five (5) Lens Parameters There are two equations available from each centroid and each frame.

$dU = Ucorrected - X_i / (-Z_i)$
$dV = Vcorrected - Y_i / (-Z_i)$

This is the setup for a non-linear least-squares problem where the left-side errors dU and dV are being minimized. The right side is approximated using the current values of the unknowns and partial derivatives with respect to those unknowns. Corrections to the unknowns are iterated in any standard mathematical way (for example but not limited to Collatz conjecture and juggler sequences).

The number of equations is:

$$N \text{ Equations} = 2 * 2 * nFrames$$

Technically a minimum of three frames of data (12 equations) are needed to calculate the 11 unknowns. However, in practice, data that covers the video camera's field of view is needed so that small residual errors in the lens parameters are not exaggerated via extrapolation into uncalibrated regions of the camera image.

The solved set of 11 parameters represents a single calibration at a particular zoom and focus setting. The process is repeated with different zoom and focus settings. This multi-step process provides data for interpolating the calibration for any given setting.

Another stage of the process requires tracking the object attached to the camera, forming the Camera Arbitrary coordinate system. The object preferably has five or more retro-reflective markers, but may have as few as three. The tracking minimizes 20 motion capture camera residuals. When tracking, at any video frame, a calibration setting is used that is an interpolation between the measured calibration settings. The second segment, then, has a dynamic 6 DOF offset from the first segment depending on the interpolated calibration setting.

Small amounts of noise in the tracking system can give unsatisfying results in the composited video. This is most noticeable when the studio camera is stationary. The "Stationary Lock" feature detects this situation. If the position of the camera hasn't moved from a specified detection distance for a specified minimum duration, then it is considered stationary and the "Locked Position" is sent instead of the tracked position. This algorithm includes a minimum amount of time that the camera is stationary before it is locked so that the system doesn't keep popping in and out of its locked state when the camera is being moved very slowly.

When the system tracks a moving object, the cameras used in that tracking changes as the object moves across the volume. When a new camera is first able to observe, the very first frames of data are typically sub-par, as these are almost always views of partially obscured markers. The refinement tracks the history of visibility of a marker by a camera, and then weights a new camera contribution according to the length of it's time history. The weight for the new camera contribution ramps up, dynamically, from a small weight to the full weight over some selected period of frames.

In one embodiment, the camera data is weighted by temporal contiguity. When weighting is completed in this way, the images are presented contiguous or close in time which results in improved imaging.

This dynamic camera tracker system then provides a "performance animation" or "performance capture" capability that cannot be achieved by conventional means. The system provides the capability to track a performer and stream the data to get a live or real-time, interactive performance. This could be any part of a performer-full body, face and hands or any subset of that. This data is part of the same data stream that contains the camera tracking It also includes the ability to track a prop.

As noted previously the forgoing descriptions of the specific embodiments are presented for purposes of illustration and description. They are not intended to be exhaustive or to limit the invention to the precise forms disclosed and obviously many modifications and variations are possible in view of the above teachings. The embodiments were chosen and described in order to explain the principles of the invention and its practical applications, to thereby enable those skilled in the art to best utilize the invention and various embodiments thereof as suited to the particular use contemplated. It is intended that the scope of the invention be defined by the claims and their equivalents.

What is claimed is:

1. In a broadcast studio having a three-dimensional optical motion capture coordinate system and a broadcast camera, a method for utilizing two-dimensional broadcast video images from at least one broadcast studio camera in a virtual broadcast studio by establishing a broadcast studio camera's calibrated line-of-sight in a virtual studio space, as follows:
    attaching a plurality of optical tracking markers to the at least one broadcast studio camera;
    capturing three-dimensional positional data of said markers on the at least one broadcast studio camera;
    attaching a plurality of optical tracking markers to a measurement rod;
    positioning a measurement wand in front of said broadcast studio camera;
    capturing three-dimensional positional data of said markers on said measurement rod; and
    calculating the offset from the position of the markers on the at least one broadcast studio camera and said broadcast camera's principal point at the lens and line-of-sight using N frames of broadcast studio video data and said captured three-dimensional positional data of the markers on said studio camera and said measurement rod using the following equations:
    $X' = (X - PPu) * Su$;
    $Y' = (Y - PPv) * Sv$;
    $Factor = 1.0 + K1 * (X'^2 + Y'^2)$;
    U corrected = $X'$*Factor;
    V corrected = $Y'$*Factor; and register the optical line-of-sight of said studio camera with said virtual studio three-dimensional coordinate space.

2. A system comprising:

at least one movable broadcast studio camera;

a measurement rod having a plurality of optical markers affixed thereto;

a plurality of optical markers affixed to said broadcast studio camera;

a plurality of fixed motion capture cameras positioned in different locations and orientations in a studio space, said motion capture cameras configured to determine the position of said broadcast studio camera markers and said measurement rod markers in said studio space;

a data acquisition system for capturing data comprising two-dimensional video images of said measurement rod markers by said broadcast studio camera at the same time the positions of said broadcast studio camera optical markers and the positions of said measurement rod optical markers are obtained by said fixed motion capture cameras, said data acquisition system including an offset calculation module for calculating an offset from the position of the markers on the at least one broadcast studio camera and said camera's principal point at the lens of said camera using the following equations:

$X' = (X-PPu)*Su$;

$Y' = (Y-PPv)*Sv$;

$Factor = 1.0 + K1*(X'^2 + Y'^2)$;

U corrected = $X'*Factor$;

V corrected = $Y'*Factor$; and using said measurement rod video images and the position of said markers, to enable registration of the optical line-of-sight of said studio camera with said studio three-dimensional coordinate space; and registration of the broadcast studio camera optical line-of-sight with a virtual coordinate system, such that, during video production, the registration of the broadcast studio camera line-of-sight with the virtual coordinate space is maintained as the broadcast studio camera moves about said studio space.

* * * * *